Jan. 3, 1928.  1,655,298
J. E. THORNTON
CINEMATOGRAPH AND OPTICAL PROJECTION APPARATUS AND SPOOL CASE AND
FILM FOR USE THEREWITH
Filed Feb. 1, 1927  2 Sheets-Sheet 2

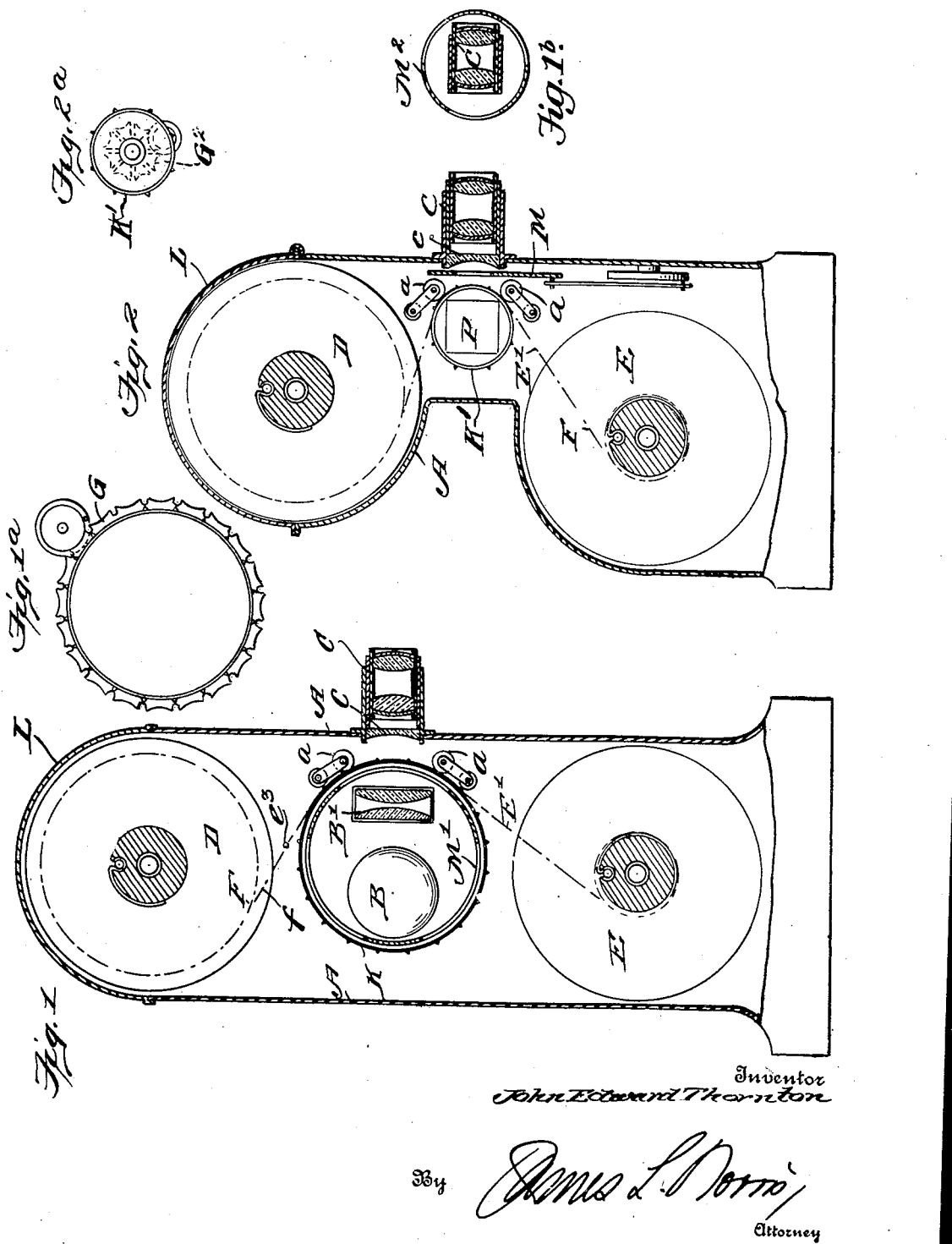

INVENTOR.
John E. Thornton
By
Attorney

Patented Jan. 3, 1928.

1,655,298

UNITED STATES PATENT OFFICE.

JOHN EDWARD THORNTON, OF WEST HAMPSTEAD, LONDON, ENGLAND.

CINEMATOGRAPH AND OPTICAL PROJECTION APPARATUS AND SPOOL CASE AND FILM FOR USE THEREWITH.

Application filed February 1, 1927, Serial No. 165,229, and in Great Britain December 11, 1925.

This invention relates to improvements in motion picture projecting machines, one object of the invention being the provision of a machine especially adapted for home use and in which a single or double film may be employed, and wherein a rotary shutter of a type which acts as a guide for the film is employed.

A further object of this invention is the provision of a motion picture projector in which the wind-on reel is permanently mounted within the framework and has attached thereto a leader strip which, when once placed within the machine and fed around the feeding mechanism to form the necessary loop and slack, is never removed from the machine, the film-carrying spool being a detachable one and being rotatively reversed to receive the film after the same has been passed through the machine.

A still further object of this invention is the provision of a simple construction of machine of this character which is light in weight and which can be readily moved from place to place and which is thoroughly efficient in practical use.

In the accompanying drawings:—

Figure 1 is a vertical transverse sectional view through the complete apparatus.

Figure 1ª is a detail view of the means for imparting intermittent rotary movement to the combined film guide and shutter.

Figure 1ᵇ shows a modified construction of film guide and shutter with the lens located within the same.

Figure 2 is a view similar to Figure 1 of a modified construction of film guide.

Figure 2ª is a detailed view showing the method of imparting intermittent rotary motion to the film guide.

Figure 4:
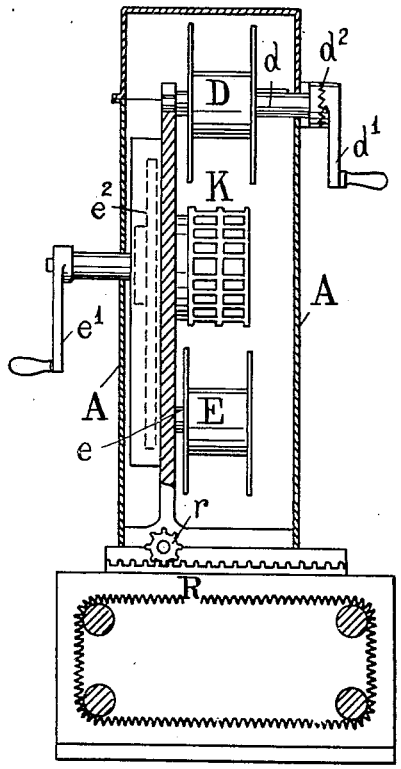
Figure 4 is a transverse sectional view through the complete machine showing the film guide and shutter for carrying a double row film, the construction otherwise being identical with that shown in Figure 1.

Referring to the drawings, and more particularly to Figures 1 and 1ª thereof, the casing A is made of sheet metal and has properly supported therein the reel E which is permanently fixed within the cabinet and carries the leader strip E' which is particularly set forth in my co-pending application, filed of even date herewith Serial No. 165,228. The upper end of the casing is provided with the hinged lid L by means of which access is had for the removal or insertion of the film spool D whose film F is attached to the hook $e^3$ carried by the leader E'. The rotary film guide K is mounted transversely of the casing A and between the reel and the spool, the same being provided with teeth which engage the sprocket openings of the leader strip and film so that the leader and film extend from the spool to the reel and forwardly of the film guide K. Mounted concentrically within the film guide is a shutter M' which is provided with open portions and sealed portions constructed and arranged so as to be rotated in consonance with the movement of the film so that light projected from the lamp B, which is disposed eccentrically of and within the combined film guide and shutter, will be projected through the lens B' and the images carried by the film, there being provided forwardly thereof a condensing lens c which tends to rectify the curvature that would be imparted to the picture due to the curvature of the film guide K, the usual lens C being exteriorly of the condensing lens c.

The film is held in contact with the film guide or drum by means of the spring-pressed guide rollers a.

In order to properly rotate the member K, there is formed at one side, as shown in Figure 1ª, the Geneva type gears G of the usal construction, the same being so disposed as to be operated in the usual way to impart the desired intermittent movement to the drum K, and consequently, cause the necessary presentation of the portions of the film to the lens.

In the construction shown in Figures 2 and 2ª, instead of using a large film guide or drum, as described previously, there is a small drum K' having mounted therewithin the prism P, the drum K' being operated, as shown in Figure 2ª, by the Geneva type gearing G², the rest of the construction being similar except that a reciprocating shutter M is disposed for movement between the film guide drum K' and the condensing lens c.

Where so desired, as shown in Figure 1ᵇ, the rotary shutter M may have the lens c' placed therewithin, this being particularly adapted for use in conjunction with the construction shown in Figure 1, the lamp, in this instance, being disposed to the rear of the drum K instead of within the same.

Figure 3:
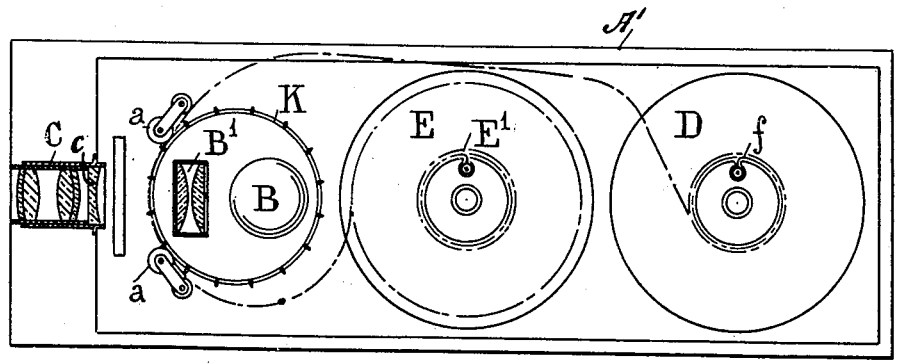
Figure 3 is a view similar to Figure 1 showing the reel and spool disposed side by side at one end of the framework with the combined film guide and shutter at the opposite end.

In the construction shown in Figure 3, the apparatus is very similar, or, in fact, identical with that shown in Figure 1 except that the reel E and the spool are arranged within a horizontal casing A' with the rotary film guide and shutter construction identical with that shown in Figure 1, but at the end of the casing instead of centrally. In this instance, the lamp B and lens B', the pressing rollers a, the condenser lens c and the regular lens C are employed.

As shown in Figure 4, the detail arrangement and mounting of the film spool D upon the shaft d is clearly illustrated with the handle d' connected to the spindle D through the one way clutch $d^2$. By this means when the film has been placed upon the reel E, it is re-wound by means of the handle d'. The film guide K, in this instance, is a double film guide for the use of what is known as the "double film", in which two rows of different pictures are placed upon a single film, and said film is so positioned upon said guide K as to present one row of pictures at a time in line with the lens. In this instance, the operating handle e' operates the gear $e^2$ and, in turn, the necessary mechanism to impart the intermittent action to the film guide, and also the shutter and the reel E, which is fixed permanently upon its spindle e, so that the film is wound thereon and the first set of pictures exposed. When it is desired to expose the next set, which may be exposed by reversing the action of the mechanism, the gear wheel r, however, being actuated so as to ride upon the rack r' and move the complete casing A so as to place the next row of pictures in line with the lens.

In this construction, the details of which are practically identical with that shown in Figures 1 and 3, a double film can be employed which gives twice the quantity with the given length and renders this particular apparatus desirable for home use.

From the foregoing description, taken in connection with the drawings, it is evident that with an apparatus constructed according to this invention, a simple, cheap and practical arrangement is produced and one which anyone can operate due to the fact that the machine is delivered with the leader strip forming the necessary loop and projected above so that the fastener $e^3$ is at all times above the respective rotary film guides K and K' and beyond the upper rollers a so as to be readily attached to the free end f of the film F, thus rendering it unnecessary for the amateur to learn how to form the loops to produce the necessary slack to the film, in this instance it only being necessary to know how to connect the ends of the leader strip to the film and to rewind the film upon the spool D and disconnect the film and leader strip.

As noted in my before-mentioned application, this leader strip E' is covered with fire-resisting material, or in such way saturated with the same as to act itself as a shutter when disposed between the light and the lens and without danger of being ignited.

I claim:—

1. A motion picture projector, including a casing, a rotary receiving reel mounted permanently in said casing, a film spool removably mounted in the casing, a hollow rotary film guide mounted in the casing, an intermittently operated shutter mounted concentrically of and within the film guide, a lens carried by the casing and in alinement with the film guide, a correcting lens interposed between the first lens and the film guide, and means for projecting light through the film guide and shutter.

2. A motion picture projector including a casing, a supply reel and a receiving reel mounted therein, a hollow rotating drum having apertures in the periphery thereof for feeding and guiding the film, a cylindrical shutter mounted within and concentric of the drum, means within the drum and shutter for projecting a beam of light through the film, and a projecting lens and a correcting lens exteriorly of the said drum, the correcting lens being between the projecting lens and the film for correcting image distortion of the curved plane of the film caused by the drum.

3. The combination in a motion picture projector, a casing, two telescopic cylindrical members comprising an outer film guide and an inner shutter, a lamp and a condenser lens located within the shutter, a correcting lens located exteriorly of the film guide, a permanently journaled reel mounted in the casing, a second reel removably journaled in the casing with the telescopic members between it and the first reel, and a leader strip attached at one end to the first reel and having its body engaging the guide and extended therebeyond and having means to engage one end of the film.

In testimony whereof I have hereunto set my hand.

JOHN EDWARD THORNTON.